United States Patent
Hong et al.

(10) Patent No.: US 9,475,585 B2
(45) Date of Patent: Oct. 25, 2016

(54) TILT-ROTOR VERTICAL-LIFT AIRCRAFT

(71) Applicant: The Boeing Company, Chicago, IL (US)

(72) Inventors: Alicia Hong, Bothell, WA (US); Daniel I. Newman, Lafayette, PA (US); Christopher R. Holtorf, Marysville, WA (US); John R. Chisholm, Springfield, PA (US); Stephen Dyess, Cherry Hill, NJ (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/315,109

(22) Filed: Jun. 25, 2014

(65) Prior Publication Data

US 2015/0375860 A1 Dec. 31, 2015

(51) Int. Cl.
*B64C 15/12* (2006.01)
*B64D 35/00* (2006.01)
*B64C 29/00* (2006.01)
*B64D 35/08* (2006.01)

(52) U.S. Cl.
CPC ........... *B64D 35/00* (2013.01); *B64C 29/0033* (2013.01); *B64D 35/08* (2013.01)

(58) Field of Classification Search
CPC ........ B64C 27/26; B64C 27/28; B64D 35/00
USPC ............ 244/12.4, 7 C, 7 A, 7 R, 6, 8, 17.11, 244/17.23, 46, 102 R
See application file for complete search history.

(56) References Cited

U.S. PATENT DOCUMENTS

| | | | | |
|---|---|---|---|---|
| 2,629,570 A * | 2/1953 | Carnahan | ............ | B64C 29/0033 244/17.13 |
| 2,749,059 A * | 6/1956 | Meyers | ................. | B64C 11/003 244/7 R |
| 3,106,369 A * | 10/1963 | Borst | ........................ | B64C 9/38 244/52 |
| 3,181,810 A * | 5/1965 | Olson | ................. | B64C 29/0033 244/66 |
| 3,404,852 A * | 10/1968 | Sambell | .............. | B64C 29/0033 244/17.13 |
| 3,526,373 A * | 9/1970 | McLarty | ................. | B64C 27/54 244/17.27 |
| 3,528,630 A * | 9/1970 | Ferris | ....................... | B64C 27/50 244/12.3 |
| 3,592,412 A * | 7/1971 | Glatfelter | ............ | B64C 29/0033 244/7 A |
| 4,979,698 A * | 12/1990 | Lederman | ........... | B64C 29/0033 244/17.13 |
| 4,982,914 A * | 1/1991 | Eickmann | ............... | B64C 11/28 244/54 |
| 5,054,716 A * | 10/1991 | Wilson | ................... | B64D 35/00 244/56 |
| 5,085,315 A * | 2/1992 | Sambell | ................... | B64C 27/30 244/17.25 |
| 6,276,633 B1 * | 8/2001 | Balayn | ................. | B64C 29/0033 244/56 |
| 7,147,182 B1 * | 12/2006 | Flanigan | ............. | B64C 29/0033 244/6 |
| 8,376,264 B1 * | 2/2013 | Hong | ...................... | B64C 27/26 244/17.23 |
| 8,602,347 B2 * | 12/2013 | Isaac | .................... | B64C 29/0033 244/23 B |
| 2010/0276549 A1 * | 11/2010 | Karem | .................... | B64C 27/08 244/7 A |
| 2011/0180673 A1 * | 7/2011 | Lim | .................... | B64C 29/0025 244/7 A |
| 2014/0138480 A1 * | 5/2014 | Richter | ................... | B64C 13/30 244/99.3 |
| 2014/0263854 A1 * | 9/2014 | Ross | ....................... | B64C 27/22 244/7 A |

OTHER PUBLICATIONS

"V-22 Osprey 2010 Guidebook", USMC, 2010, p. 40.*

* cited by examiner

*Primary Examiner* — Brian M O'Hara
*Assistant Examiner* — Assres H Woldemaryam
(74) *Attorney, Agent, or Firm* — Kunzler Law Group, PC

(57) ABSTRACT

Described herein is an aircraft that includes a fuselage with a higher portion and a lower portion. The aircraft also includes two fixed wings that are coupled to and extend from opposing sides of the lower portion of the fuselage. Additionally, the aircraft includes a tilt-rotor assembly that is coupled to each of the two fixed wings.

15 Claims, 9 Drawing Sheets

TILT-ROTOR VERTICAL-LIFT AIRCRAFT

FIELD

This disclosure relates generally to aircraft, and more particularly to tilt-rotor, vertical-lift aircraft.

BACKGROUND

A tilt-rotor, vertical-lift aircraft generates both lift and propulsion by tilt-rotor assemblies coupled to fixed wings of the aircraft. Each tilt-rotor assembly includes a rotatable rotor that is powered by an engine. The tilt-rotor assemblies can be tilted to adjust the plane of rotation of the rotors between horizontal and vertical. With the rotors rotating in a horizontal plane of rotation, the rotors provide all the vertical lift of the aircraft. In contrast, with the rotors rotating in a vertical plane of rotation, the rotors provide only the forward propulsion of the aircraft, and the fixed wing provides the lift of the aircraft. The tilt-rotor assemblies also may be tilted to adjust the plane of rotation of the rotors into any number of planes between the vertical and horizontal planes such that the rotors provide some combination of lift and forward thrust. Accordingly, a tilt-rotor, vertical-lift aircraft provides the vertical lift capability of a rotary-wing aircraft, such as a helicopter, and the speed of a conventional fixed-wing aircraft.

The fixed wings of conventional tilt-rotor, vertical-lift aircraft are high wings coupled to and extending from higher portions of the fuselage or body of the aircraft. Additionally, the engines powering the rotors of conventional tilt-rotor, vertical-lift aircraft form part of the tilt-rotor assemblies. Accordingly, the engines are movably coupled to the fixed wings of the aircraft and tilt with the tilt-rotor assemblies.

SUMMARY

The subject matter of the present application has been developed in response to the present state of the art, and in particular, in response to the problems and needs associated with conventional tilt-rotor, vertical-lift aircraft that have not yet been fully solved by currently available aircraft.

As an example, the high-wing configuration of conventional tilt-rotor, vertical-lift aircraft introduces many shortcomings. One such shortcoming includes increased weight and complexity associated with structural reinforcements in the fuselage under the wings that are required to prevent the high wings from crushing the fuselage during a crash. Additionally, due to the placement of high wings on the aircraft, maintaining and fueling the aircraft may be difficult, as well as removing and servicing engines on such aircraft. Another shortcoming of the high-wing configuration of conventional tilt-rotor, vertical-lift aircraft includes the inability of the fuselage of the aircraft to float in a water landing. Yet an additional shortcoming introduced by the high-wing configuration includes the necessity for the landing gear of the aircraft to be stored in and extended from the fuselage of the aircraft as opposed to the wings. Also, most conventional commercial aircraft have low-wing configurations, which would make servicing, taxiing, and loading/unloading an aircraft with a high-wing configuration more difficult in a commercial passenger transportation setting, such as an airport. Furthermore, due to concerns regarding fuel leakage into the fuselage or cabin, aircraft with high-wing configurations generally do not utilize space available on the wings for fuel tanks.

According to another example of a shortcoming, many conventional tilt-rotor, vertical-lift aircraft include just two engines for powering the tilt-rotor assemblies. Although the power generated by the two engines may be combined to power or share between the tilt-rotor assemblies, should an engine become inoperable during flight, in order to provide the minimum regulated amount of power to both assemblies for sustained flight, each engines must be effectively 50% more powerful (e.g., larger) than necessary. Also, some conventional tilt-rotor, vertical-lift aircraft do not interconnect the tilt-rotor assemblies, which requires even larger engines on each wing to compensate for engine failures. Furthermore, with the engines integrated into the tilt-rotor assemblies (which are commonly positioned at the tips of the fixed wings), to compensate for the added cantilevered weight at the tips of the wings, the wings and/or fuselage often require structural reinforcements. As mentioned above, such structural reinforcements may add to the overall weight and complexity of the aircraft.

In view of the foregoing, the subject matter of the present application has been developed to provide a tilt-rotor, vertical-lift aircraft, and an associated method for operating an aircraft, that overcome at least some of the above-discussed shortcomings of conventional tilt-rotor, vertical-lift aircraft. For example, in some embodiments, because the tilt-rotor, vertical-lift aircraft of the present application has a low-wing configuration, the aircraft does not require structural reinforcements to prevent the wings from crushing the fuselage during a crash, maintaining and refueling the aircraft are easier, the fuselage may float in a water landing, landing gear can be stored in the wings, and the aircraft can be treated and handled as other conventional low-wing commercial aircraft at airports. Other advantages with the low-wing configuration of the aircraft described in the present application may include the availability of mid-cabin exit doors without the need for escape slides, and other safety benefits.

Concerning the use of at least three (e.g., more than two) engines to power the tilt-rotors of the aircraft of the present application, in some embodiments, because the power generated by the engines is shared between more engines, the engines can be less powerful (e.g., smaller) and still meet the minimum regulated amount of power for sustained flight. Additionally, because the engines are fixedly secured to the wings in some embodiments, and not integrated into the tilt-rotor assemblies, cantilevered weight at the tips of the wings is reduced. Furthermore, because the tilt-rotor assemblies of the aircraft of the present disclosure are interconnected via a common power transmission system in some embodiments, the engines can be smaller than conventional engines for improved ground clearance, or the same size as conventional engines to increase the cargo/passenger carrying capabilities of the aircraft over conventional aircraft.

According to one embodiment, an aircraft includes a fuselage with a higher portion and a lower portion. The aircraft also includes two fixed wings that are coupled to and extend from opposing sides of the lower portion of the fuselage. Additionally, the aircraft includes a tilt-rotor assembly that is coupled to each of the two fixed wings. In some implementations of the aircraft, each of the tilt-rotor assemblies is coupled to a tip of a respective fixed wing.

In certain implementations, the aircraft also includes at least two engines each operatively coupled to the tilt-rotor assemblies via a common power transmission system. The aircraft can include at least two engines non-movably coupled to one of the two fixed wings and at least two engines non-movably coupled to another of the two fixed wings. The engines can be operatively coupled to the tilt-rotor assemblies via the common power transmission system. The common power transmission system may include a driveshaft that extends along the two fixed wings and across the fuselage.

According to some implementations, the aircraft also includes at least two engines coupled to each of the two fixed wings. The at least two engines of each of the two fixed wings are operatively coupled one of the tilt-rotor assemblies via a separate one of two power transmission systems. In certain implementations, the power transmission systems do not extend across the fuselage.

In certain implementations, the aircraft additionally includes a first engine coupled to a first of the fixed wings, a second engine coupled to a second of the fixed wings, and a third engine coupled to one of the first wings, second wings, or fuselage. The first, second, and third engines are operatively coupled to the tilt-rotor assemblies via a common power transmission system.

According to another embodiment, an aircraft includes a fuselage. The aircraft also includes first and second fixed wings coupled to and extending from opposing sides of the fuselage. Additionally, the aircraft includes first and second tilt-rotor assemblies coupled to the first and second fixed wings, respectively. At least two first engines are non-movably coupled to the first fixed wing, and at least two second engines are non-movably coupled to the second fixed wing. The first and second engines are operatively coupled to both the first and second tilt-rotor assemblies via a common power transmission system.

In some implementations of the aircraft, the power transmission system includes a driveshaft that extends along the first and second fixed wings and across the fuselage.

According to some implementations of the aircraft, the common power transmission system includes at least two first engine gearboxes in power receiving communication with a respective one of the two first engines. The common power transmission also includes at least two second engine gearboxes in power receiving communication with a respective one of the two second engines. The two first engine gearboxes and the two second engine gearboxes are in power providing communication with a driveshaft of the common power transmission system. The common power transmission system can include a cross-shafting gearbox coupled to the driveshaft. The cross-shafting gearbox may distribute power generated by the first and second engines evenly between the first and second tilt motor assemblies.

In certain implementations of the aircraft, the two first engines are arranged in a side-by-side configuration, and the two second engines are arranged in a side-by-side configuration. The two first engines can be arranged in an end-to-end configuration, and the two second engines can be arranged in an end-to-end configuration in other implementations. In yet some implementations, the two first engines are arranged in a staggered configuration, and the two second engines are arranged in a staggered configuration. In the staggered configuration, compressors of the at least two first engines are axially offset and compressors of the at least two second engines are axially offset.

According to some implementations of the aircraft, the fuselage includes a higher portion and a lower portion. The first and second fixed wings are coupled to and extend from the lower portion of the fuselage.

In another embodiment, a vertical-lift aircraft includes a fuselage with a higher portion and a lower portion. The aircraft also includes two low fixed wings that are coupled to and extend from opposing sides of the lower portion of the fuselage. Further, the aircraft includes two tilt-rotor assemblies that are each coupled to a respective one of the two fixed wings. At least two engines are non-movably coupled to each of the two fixed wings. The aircraft additionally includes a power transmission system that is configured to transmit power generated by each of the engines to both of the two tilt-rotor assemblies.

According to certain implementations of the aircraft, each of the two tilt-rotor assemblies is coupled to a tip of the respective one of the two fixed wings. The two tilt-rotor assemblies can each rotate a rotor between a vertical orientation and a horizontal orientation. The aircraft can be a commercial passenger aircraft.

In yet another embodiment, a method for operating an aircraft includes providing a tilt-rotor, vertical-lift aircraft with two low fixed wings and two tilt-rotor assemblies each rotatably coupled to a respective one of the two low fixed wings. The vertical-lift aircraft further includes at least three engines (e.g., two stationary engines that are non-movably coupled to each of the two low fixed wings). The method includes combining power generated by the stationary engines to form a first combined power and evenly dividing the first combined power between the two tilt-rotor assemblies.

In some implementations, the method includes determining at least one of the stationary engines to be inoperable, combining power generated by remaining operable stationary engines to form a second combined power that is less than the first combined power, and evenly dividing the second combined power between the two tilt-rotor assemblies.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
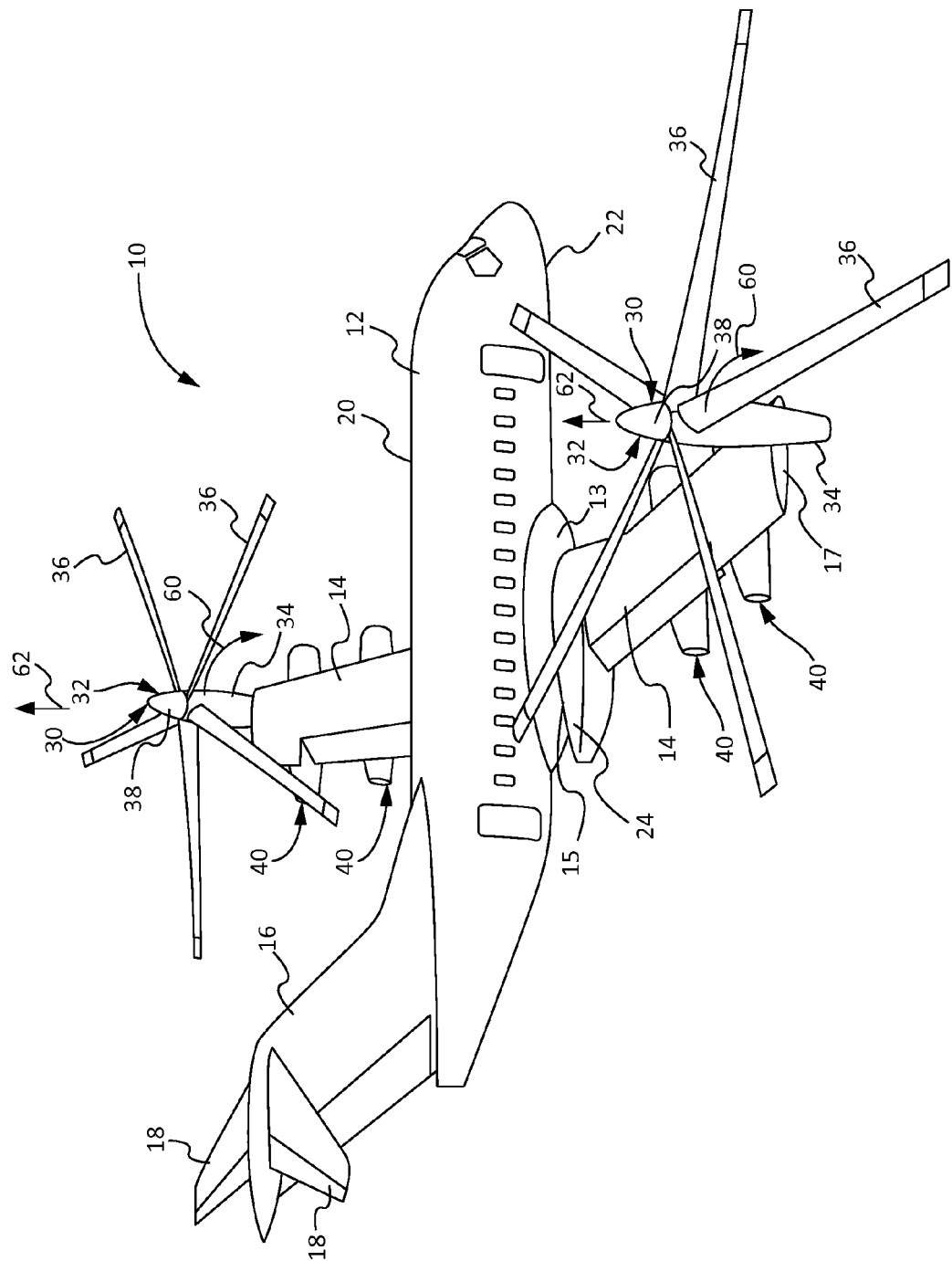
FIG. 1 is a perspective view of an aircraft according to one embodiment shown with a tilt-rotor assembly in a first position.

Referring to FIG. 1, one embodiment of an aircraft 10 is shown. The depicted aircraft 10 includes a fuselage 12 or body, a pair of wings 14 coupled to and extending from the fuselage 12, a vertical stabilizer 16 coupled to the fuselage, and a pair of horizontal stabilizers 18 coupled to the vertical stabilizer. In alternative embodiments, the horizontal stabilizers 18 can be coupled directly to the fuselage 12. The aircraft 10 includes features representative of a commercial passenger aircraft, such as having one or more of a substantially elongate fuselage 12 for accommodating multiple rows of passenger seats, multiple windows corresponding with the rows of passenger seats, multiple exit doors, cabin pressurization for high-altitude operations, passenger lavatories, passenger galleys, and a cargo containment area capable of containing passenger cargo. In one implementation, the aircraft 10 is a regional commercial passenger aircraft capable of accommodating the transportation (including seating) of at least 100 passengers. However, the aircraft 10 can be any of various other types of commercial or non-commercial aircraft, such as personal aircraft, commercial non-passenger aircraft, and military aircraft.

Figure 3:
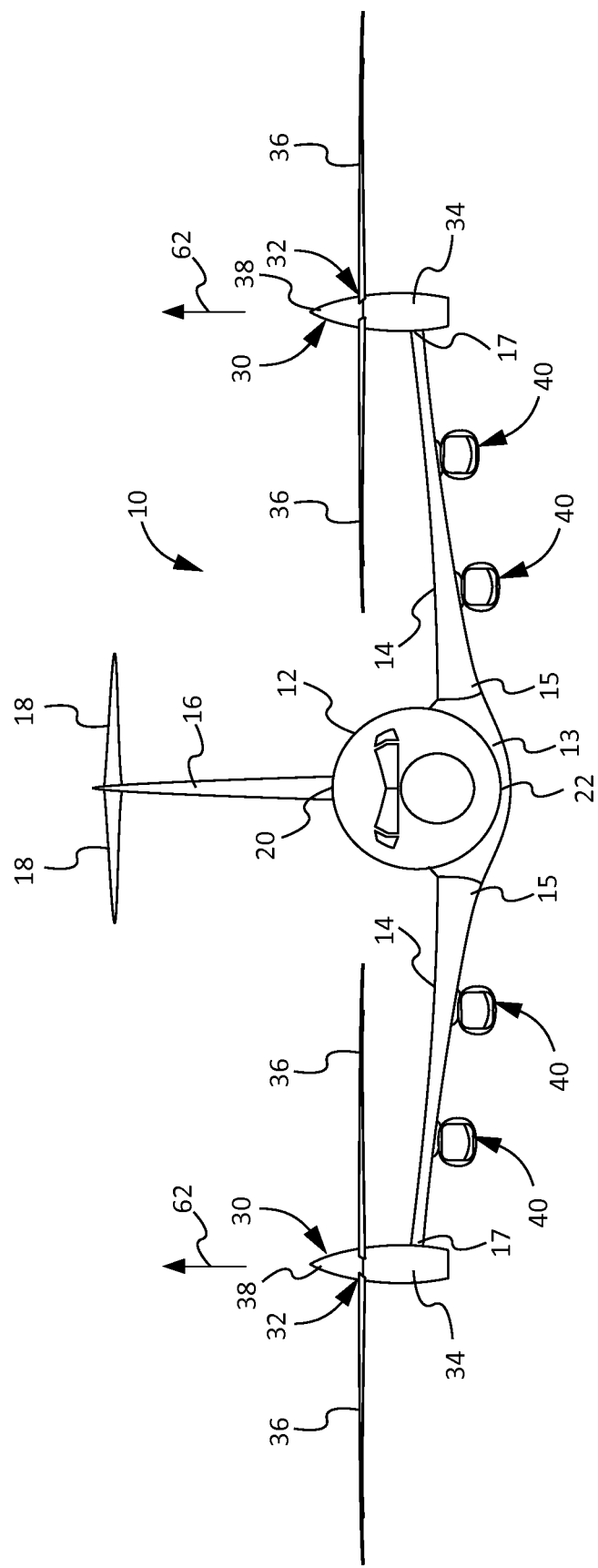
FIG. 3 is a front view of the aircraft of FIG. 1 shown with the tilt-rotor assembly in the first position.
Figure 4:
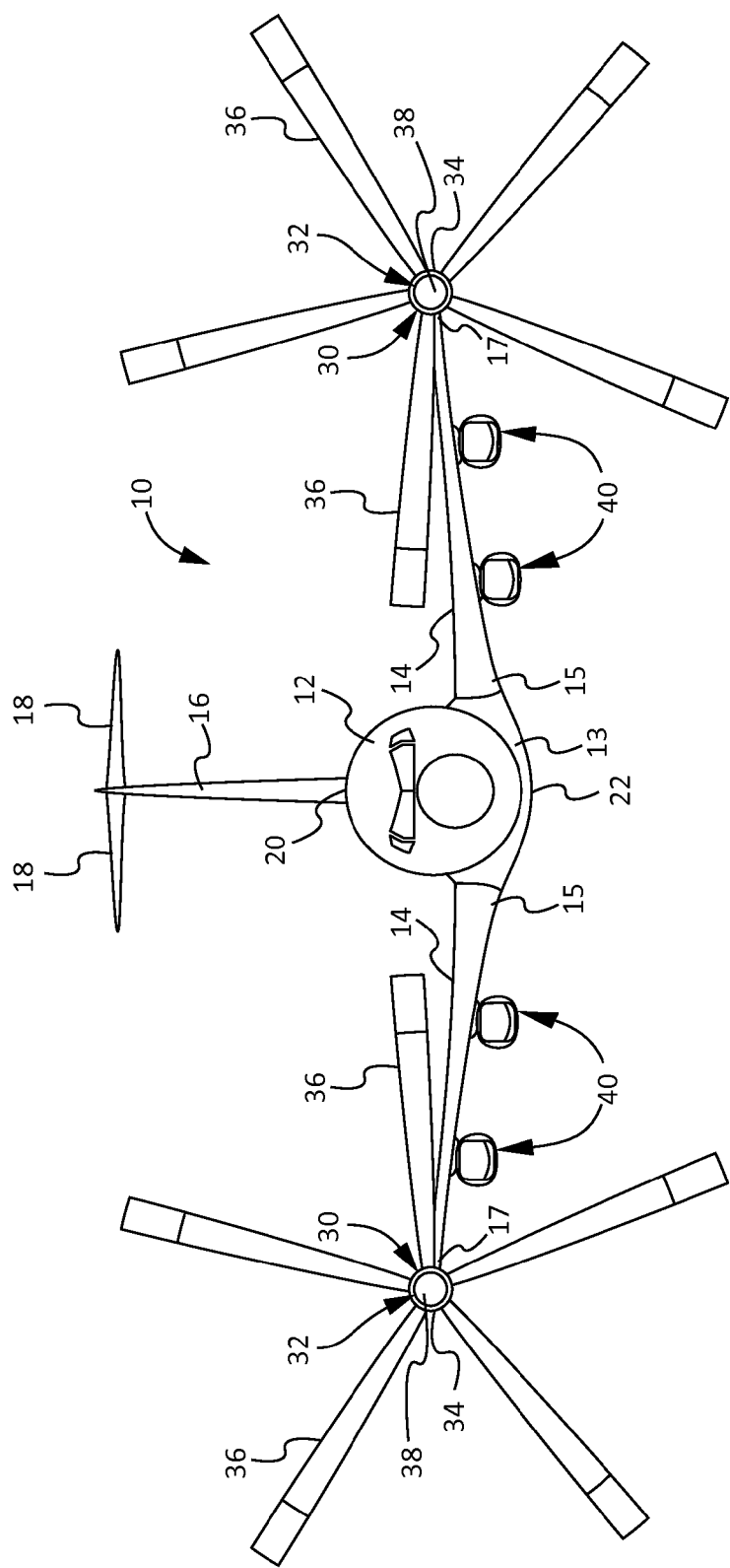
FIG. 4 is a front view of the aircraft of FIG. 1 shown with the tilt-rotor assembly in the second position.

The fuselage 12 includes a higher portion 20 proximate a top of the fuselage, and a lower portion 22 proximate a bottom of the fuselage (see, e.g., FIGS. 3 and 4). In some implementations, the higher portion 20 can be defined as the top half of the fuselage 12, and the lower portion 22 can be defined as the bottom half of the fuselage. According to certain implementations, the higher portion 20 can be defined as the top quarter of the fuselage 12, and the lower portion 22 can be defined as the bottom quarter of the fuselage. Each wing 14 is fixedly or non-movably coupled to and extends away from the lower portion 22 of the fuselage. Accordingly, the aircraft 10 is considered a low-wing aircraft. Although each wing 14 may have moving parts, such as flaps, ailerons, and spoilers, the wings are considered fixed wings because inboard portions 15 of the wings are fixed directly to the fuselage 12 (or other structure (e.g., a wing reinforcement member 13 or wing root fairing or yehudi) directly fixed to the fuselage) in a non-movable manner. In some implementation, the wing reinforcement member 13 is considered part of the lower portion 22 of the fuselage 12.

Generally, the wings 14 extend away from the lower portion 22 of the fuselage 12 in a direction that is substantially transverse to a length of the fuselage. However, in some implementations, the wings 14 may be angled with respect to the length of the fuselage 12 at any of various angles as desired. Moreover, the wings 14 extend longitudinally from the inboard portion 15, which is fixed to the lower portion 22 of the fuselage 12 via the wing reinforcement member 13, to a cantilevered outboard portion 17 or tip away from the fuselage.

Figure 2:
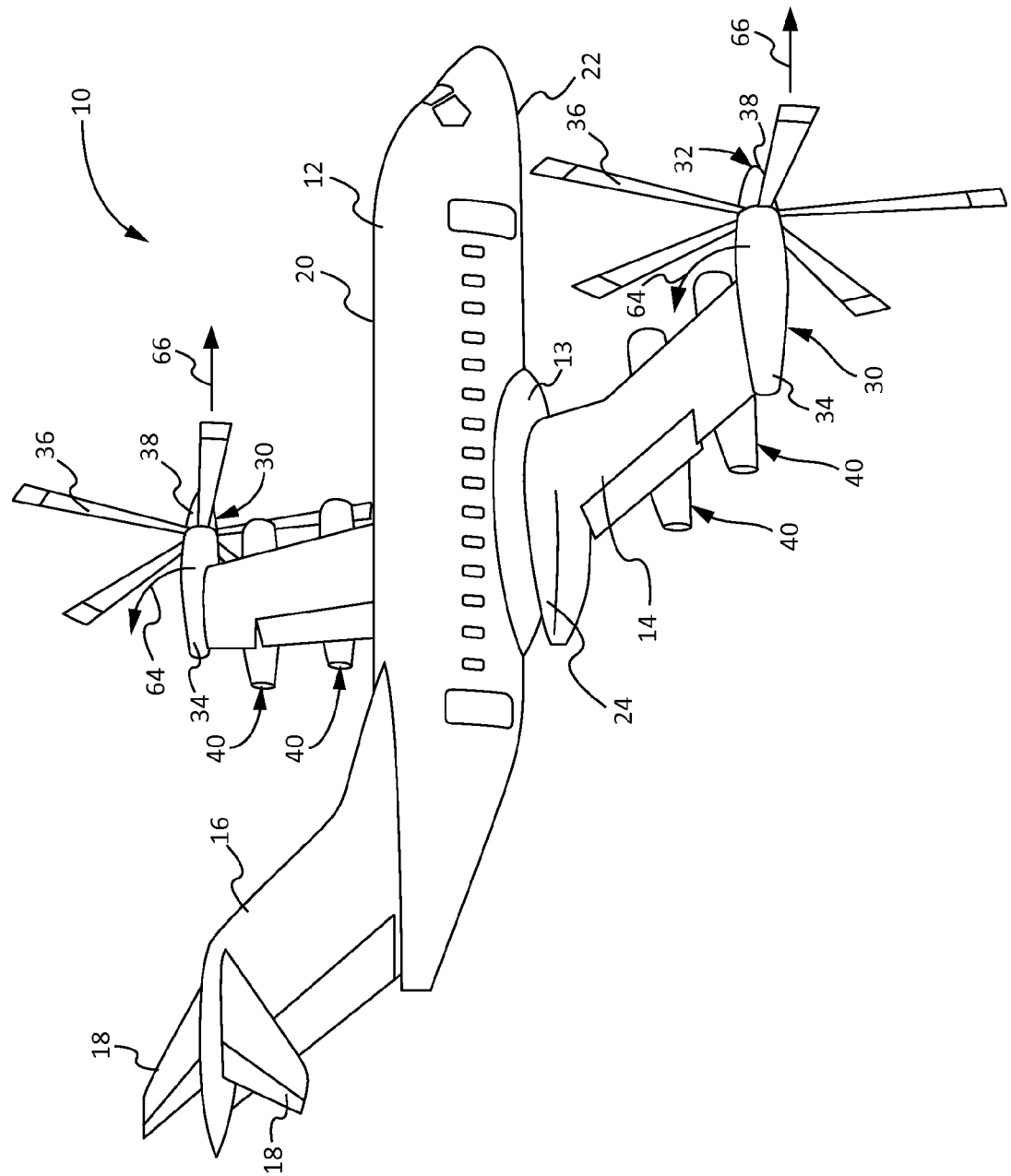
FIG. 2 is a perspective view of the aircraft of FIG. 1 shown with the tilt-rotor assembly in a second position according to one embodiment.

In some implementations, such as shown in FIGS. 1 and 2, each wing 14 of the aircraft 10 includes a landing gear fairing 24 or portion proximate the inboard portion of the wing. The landing gear fairing 24 may house a portion of the landing gear (not shown) of the aircraft. The landing gear may retract (e.g., up and aft) at least partially into the landing gear fairing 24 for storing the landing gear within the landing gear portion when not in use, such as during flight. Additionally, the landing gear may be extended from within the landing gear fairing 24 for landing and on-ground transportation purposes.

The aircraft 10 includes two tilt-rotor assemblies 30 each movably coupled to a respective one of the wings 14. In the illustrated embodiments, the tilt-rotor assemblies 30 are rotatably or tiltably coupled to the outboard portions 17 of the wings 14. Each tilt-rotor assembly 30 includes a tilting mechanism (not shown) that is operable to rotate or tilt the tilt-rotor assembly between different orientations relative to the fuselage 12 and wings 14. Generally, the tilting mechanism includes an actuator secured to the wing that pushes or pulls the tilt-rotor assembly 30 to rotate the assembly relative to the wing. In some implementations, the tilting mechanism rotates the tilt-rotor assembly 30 between a vertical orientation (see, e.g., FIGS. 1 and 3) and a horizontal orientation (see, e.g., FIGS. 2 and 4) as indicated by directional arrows 60, 64. The vertical orientation can be considered a maximum lift orientation and the horizontal orientation can be considered a maximum forward-propulsion orientation. Because the aircraft 10 includes tilt-rotor assemblies 30 that provide vertical lift and horizontal propulsion, the aircraft can be considered a tilt-rotor, vertical-lift aircraft.

Each tilt-rotor assembly 30 includes a base 34 to which a rotor 32 is rotatably coupled. The rotor 32 or propeller includes a plurality of spaced-apart blades 36 extending from a nose cone 38. In some implementations, each blade 36 of the rotor 32 may be rotatable about a central axis of the blade to adjust the pitch of the blade. Although the pitch of the blades 36 can be adjustable, as shown in FIG. 3, the blades 36 of the rotor 32 are generally co-planar with each other. In other words, each of the blades 36 extends radially outward from the cone 38 along the same plane. Because the blades 36 remain co-planar as the rotor 32 rotates, the common plane of the blades 36 is defined as the plane of rotation.

Due to the pitch of the blades 36, as the rotor 32 rotates, the blades generate thrust in a thrust direction. For example, with the tilt-rotor assembly 30 in the vertical orientation, the plane of rotation of the blades 36 is a horizontal plane and the thrust direction is vertical (e.g., downward). The downwardly directed thrust results in upwardly directed movement (e.g., lift) of the aircraft 10 as indicated by directional arrow 62. In contrast, with the tilt-rotor assembly 30 in the horizontal orientation, the plane of rotation of the blades 36 is a vertical plane and the thrust direction is horizontal (e.g., backward). The backwardly directed thrust results in forwardly directed movement (e.g., forward propulsion) of the aircraft 10 as indicated by directional arrow 66. In this manner, the tilt-rotor assemblies 30 cooperate to vertically lift the aircraft 10 from the ground, and propel the aircraft forward.

The tilting mechanism also is operable to tilt the tilt-rotor assembly 30 into any of various orientations between the vertical and horizontal orientations. With the tilt-rotor assembly 30 in an orientation between the vertical and horizontal orientations, the plane of rotation of the blades 36 correspondingly is a plane between the horizontal and vertical planes. Accordingly, the thrust generated by the blades 36 has a thrust direction between downward and backward, such that the thrust moves the aircraft 10 both upwardly and forwardly (e.g., provides both lift and forward propulsion). In this manner, the tilt-rotor assemblies 30 facilitate the transition between maximum lift and maximum forward propulsion. As soon as the tilt-rotor assemblies 30 transition from providing maximum lift to at least partially forward propulsion, the lift begins to be at least partially generated by the wings 14 acting as airfoils until the tilt-rotor assemblies 30 provide maximum forward propulsion at which time the wings provide all the lift.

The aircraft 10 also includes at least two engines 40 that are operable to generate power for powering the tilt-rotor assemblies 30. In the illustrated embodiment, the engines 40 are fixedly or non-movably secured to the wings 14. Although each engine 40 has moving parts, such as compressors and turbines, the engine are considered fixed or stationary engines because the engines are fixed directly to the wings 14 (or other structure of the aircraft 10) in a non-movable manner. As shown, the engines 40 are fixedly secured to a lower surface of the wings 14 and positioned beneath the wings. The engines 40 can be fixedly secured underneath the wings 14 using any of various techniques and engine mounts. Although the engines 40 are secured to the wings 14 and positioned below the wings in the illustrated embodiments, in other embodiments, the engines can be secured to the wings and positioned above the wings, or secured to another component of the aircraft 10. Generally, the engines 40 can be positioned anywhere on the aircraft 10 that enables the transmission of rotational mechanical energy to the tilt-rotor assemblies 30. Additionally, although the engine 40 are fixedly or non-movably secured to the aircraft 10 in the illustrated embodiments, it is recognized that in some embodiments the engines 40 can be integrated into the tilt-rotor assemblies 30 and be rotatable with the tilt-rotor assemblies while still achieving at least some of the above-discussed advantages of the aircraft of the present disclosure.

The engines 40 can be any of various internal combustion engines known in the art, such as turboprop engines having a compressor and turbine. Generally, the engines 40 generate power by combusting a fuel and air mixture. The engines 40 convert thermal energy produced from the combustion of the fuel and air mixture into rotational mechanical energy. The rotational mechanical energy is then transmitted to the tilt-rotor assemblies 30 via a power transmission system as will be described below in more detail. The rotational mechanical energy transmitted to the tilt-rotor assemblies 30 is used to rotate the rotors 32 of the tilt-rotor assemblies 30.

In the illustrated embodiments, the aircraft 10 includes four engines 40 with two engines fixedly secured to each of the wings 14. In other embodiments, the aircraft 10 includes more than four engine 40 with half the engines fixedly secured to each of the wings 14. However, in some embodiments, the aircraft 10 may only include two engines 40 with one engine fixedly secured to each of the wings 14. In yet an alternative embodiment, the aircraft 10 can include four or more engines 40 with at least one of the engines being fixedly secured to each of the wings (or other component of the aircraft), and at least one of the engines being rotatably secured to each of the wings via integration into each of the tilt-rotor assemblies 30. Also, in some embodiments, the aircraft 10 can include at least one engine 40 fixedly secured to each of the wings 14, and at least one engine fixedly secured to another component of the aircraft. Additionally, in certain embodiments, the aircraft 10 includes three engines 40 where each of the engines is interconnected by a common power transmission system. Two of the three engines could be coupled to the wings or tilt-rotor assemblies on respective sides of the aircraft, and the third engine could be coupled to another portion of the aircraft, such as the fuselage, or offset on one of the wings.

Figure 5:
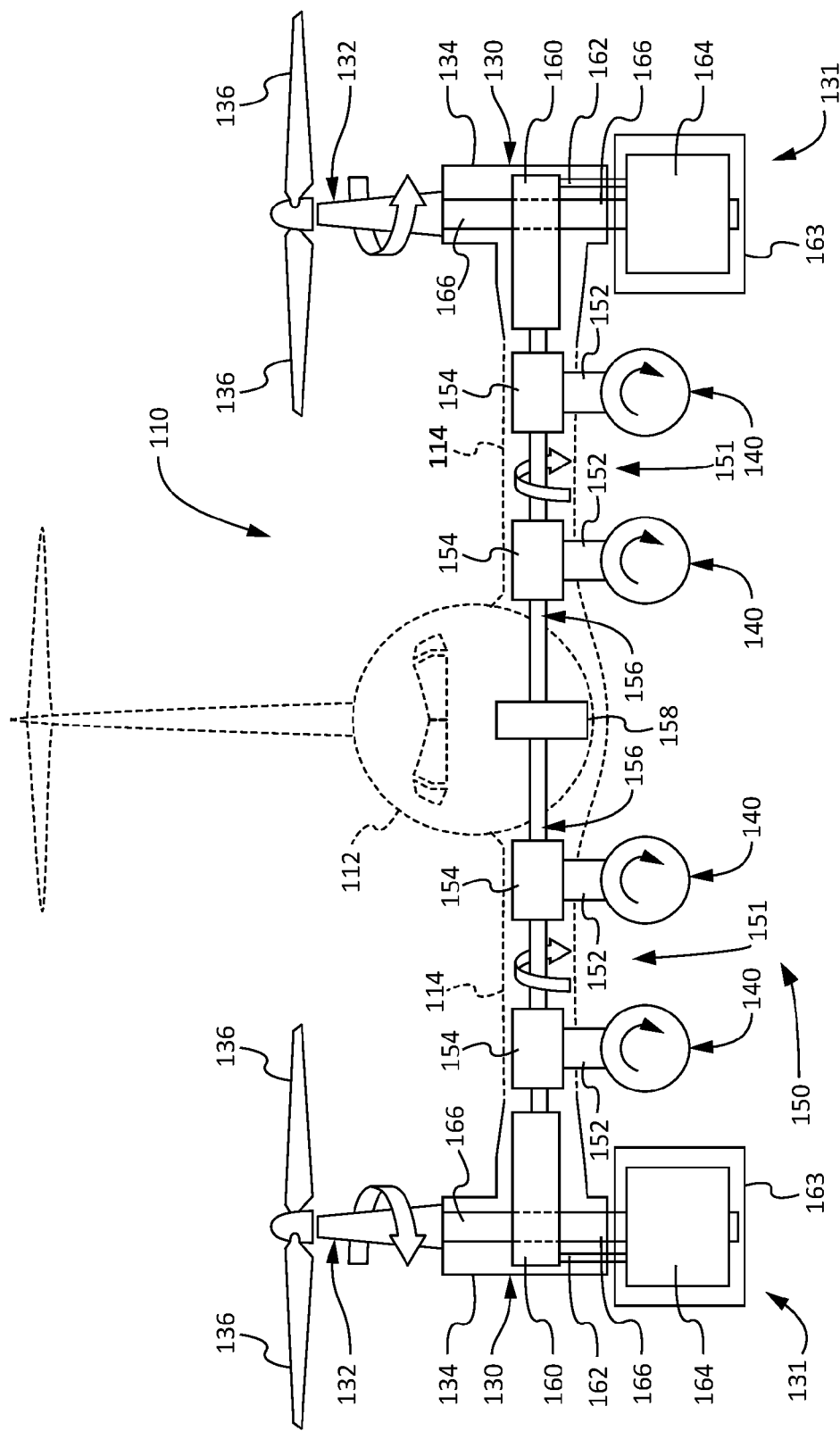
FIG. 5 is a schematic front view of an aircraft with tilt-rotor assemblies and a common power transmission system according to one embodiment.

Referring to FIG. 5, one embodiment of an aircraft 110 with some features analogous to the features of the aircraft 10 is shown. The analogous features are represented with analogous reference numbers. More specifically, the features of the aircraft 110 that are analogous to the features of the aircraft 10 share the same reference numbers, but are represented with a 100-series number instead of a 10-series number. For example, like the aircraft 10, the aircraft 110 includes a fuselage 112, wings 114 coupled to a lower portion of the fuselage, tilt-rotor assemblies 130 rotatably coupled to the wings, and engines 140 fixedly coupled to the wings. Additionally, as shown schematically, the aircraft 110 includes a power transmission system 150 that extends from the outboard portion or tip of one wing 114, through the fuselage 112, to the outboard portion or tip of the opposing wing. It is also noted, the aircraft shown in FIG. 5 is a schematic representation of the aircraft, and therefore not shown to scale.

The power transmission system 150 includes two identical and opposing sections 151 each associated with a respective one of the wings 114. The two sections 151 of the power transmission system 150 are separated, but operatively linked, by a mid-wing gearbox 158. The mid-wing gearbox 158 is positioned within the fuselage 112 between the wings 114. Generally, the mid-wing gearbox 158 includes gears and/or other components that regulate and evenly distribute mechanical rotational energy between the opposing section 151 of the power transmission system 150. In one implementation, the mid-wing gearbox 158 includes a mechanical differential as is known in the art. Although not shown, the power transmission system 150 of the aircraft 110 can include a power take-off (PTO) device that transmits power from the power transmission system 150 to one or more sub-systems of the aircraft 110. According to some implementations, the PTO device can be located in the fuselage 112, and coupled to and receive power from the mid-wing gearbox 158. In other implementations, the PTO device can be located inside or outside the fuselage, and be coupled to and receive power from other components of the power transmission system 150.

Each section 151 of the power transmission system 150 includes a driveshaft 156 that extends from the fuselage 112, internally along a respective wing 114, to the outboard portion or tip of the wing. An inboard end portion of each driveshaft 156 is rotatably coupled to the mid-wing gearbox 158 and an outboard end portion of each driveshaft is rotatably coupled to a respective tilt-rotor assembly 130. Each driveshaft 156 may be a continuous shaft, one-piece, shaft in some implementations. However, in other implementations, each driveshaft 156 includes multiple separate and interconnected shafts. Accordingly, although the driveshaft 156 may be made up of multiple separate shafts, because the shafts are interconnected, the assembly of interconnected shafts can be considered one driveshaft.

In the illustrated embodiment, the driveshaft 156 of each section 151 of the power transmission system 150 is in power receiving communication with the engines 140 fixed to the corresponding wing 114 via respective right-angle gearboxes 152 and driveshaft gearboxes 154. Each engine 140 operates to rotationally drive an engine driveshaft (not shown) that rotates about a first axis. The engine driveshaft is mechanically coupled to a respective right-angle gearbox 152 that transmits the rotational mechanical energy from the engine driveshaft to a vertical output shaft (not shown) of the right-angle gearbox that rotates about a second axis substantially perpendicular to the first axis. In some implementations, the right-angle gearbox 152 may include two bevel gears in gear-meshing engagement with each other.

The output shaft of the right-angle gearbox 152 is mechanically coupled to a respective driveshaft gearbox 154. In some implementations, the driveshaft gearboxes 154 are positioned within the wings 114 above (or in some cases below or to the side of) the corresponding engine 140. Each driveshaft gearbox 154 is configured to receive rotational mechanical energy from the vertical output shaft of the right-angle gearbox 52 to which it is attached, and transmit the energy to the driveshaft 156 to rotationally drive the driveshaft in a driving rotational direction as shown. Because the driveshaft 156 extends through (or two driveshaft sections extend from) the driveshaft gearbox 154, the driveshaft gearbox effectively splits the rotational mechanical energy from the corresponding engine 140 to the shaft in two directions, with the shafts in each direction rotating in the same driving rotational direction as shown. In some implementations, the driveshaft gearboxes 154 may function as differentials. In other words, the driveshaft gearbox 154 includes one rotational mechanical energy input and two rotational mechanical energy outputs.

The rotational mechanical energy from one output of the driveshaft gearbox 154 ultimately is transmitted to the tilt-rotor assembly 130 that is coupled to the same wing 114 as the driveshaft gearbox, and the rotational mechanical energy from the other output of the driveshaft gearbox ultimately is transmitted (via cross-shafting accommodated by the mid-wing gearbox 158) to the tilt-rotor assembly that is coupled to the opposite wing. In this manner, the power generated by one engine 140 is transmitted to, or is shared by, both the tilt-rotor assemblies 130 of the aircraft 110. Accordingly, the power transmission system 150 can be considered a common power transmission system 150 with a common or co-rotating driveshaft 156 for evenly distributing power generated by all the engines 140 to the tilt-rotor assemblies 130. Additionally, in view of the common power transmission system 150 and common driveshaft 156, power from less than all of the engines 140 can be evenly distributed to both the tilt-rotor assemblies 130 should one or more of the engines become inoperative. Further, because the aircraft 110 has four engines 140, if one engine becomes inoperable, three engines are available to share a mandatory minimum operational load of the tilt-rotor assemblies 130. Because more than one engine is available for sharing the minimum load, the engines 140 can be smaller, or less powerful, than if only one engine was available for sharing.

Although the aircraft 110 shown in FIG. 5 includes a common power transmission system 150 and common driveshaft 156 that extend through the fuselage 112 between the engines 140 on each side of the fuselage, in some embodiments, each set of two engines on each side of the fuselage has its own power transmission system and driveshaft. In other words, in certain embodiments, the aircraft 110 does not have a common power transmission system 150 such that shafting does not extend through the fuselage 112.

According to one embodiment shown schematically in FIG. 5, each tilt-rotor assembly 130 includes a drive system 131 for receiving rotational mechanical energy from the power transmission system 150 and transmitting the received energy to the rotor 132 for rotating the rotors. Although other configurations for transferring power from the driveshaft 156 to the rotors 132 are possible in view of the present disclosure, in the illustrated embodiment, each drive system 131 of the tilt-rotor assemblies 130 includes a wingtip gearbox 160, a power transmission shaft 162, a speed reduction gearbox 164, and a rotor driveshaft 166. The wingtip gearbox 160 is mechanically coupled to the driveshaft 156 to receive rotational mechanical energy from the driveshaft. Additionally, the wingtip gearbox 160 includes gears, or other similar components, that transmit the energy received from the driveshaft 156 to the power transmission shaft 162. The wingtip gearbox 160 can be housed within a housing of the base 134.

The power transmission shaft 162 transfers rotational mechanical energy from the wingtip gearbox 160 to the speed reduction gearbox 164, which is mechanically coupled to the rotor driveshaft 166 to drive (e.g., rotate) the rotor driveshaft. Generally, the speed reduction gearbox 164 includes gears, or other similar components, that transmit the rotational mechanical energy received from the power transmission shaft 162 to the rotor driveshaft 166. The speed reduction gearbox 164 can be housed within a housing 163. In some implementations, the gears of the speed reduction gearbox 164 form a planetary gear system. Because the rotational or angular speeds of the engines 140 and driveshaft 156 are substantially higher than desired rotational or angular speeds of the rotors 132, the speed reduction gearbox 164 is configured to drive the rotor driveshaft 166 at a rotational speed that is substantially less than the rotational speed of the power transmission shaft 162, which can rotate at the same speed as the engines and driveshaft. In other words, in some implementations, a gear train of the speed reduction gearbox 164 produces a speed ratio of the rotational speed of its input gear to the rotational speed of its output gear that is substantially less than one. In one particular implementation, for example, the engines 140, driveshaft 156, and power transmission shaft 162 may have a rotational speed between about 6,440 RPM and about 7,680 RPM, and the rotor driveshaft 166 may have a rotational speed between about 197 RPM and 235 RPM (i.e., a speed ratio between about 0.02 and about 0.04). Of course, these ranges are merely exemplary and any of various other ranges are possible as desired.

Figure 6:
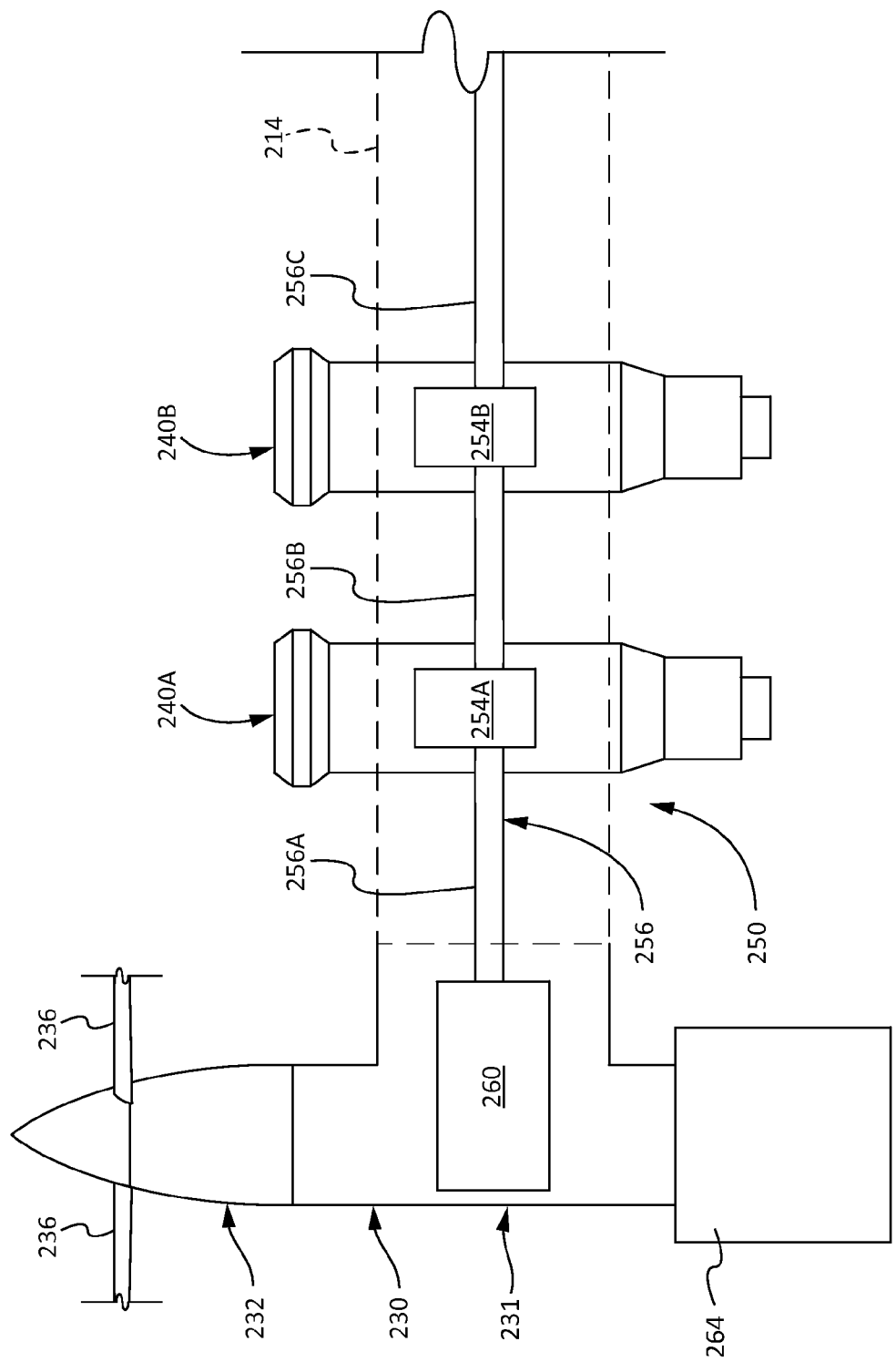
FIG. 6 is a schematic top view of a tilt-rotor assembly driven by engines in a side-by-side configuration according to one embodiment.
Figure 7:
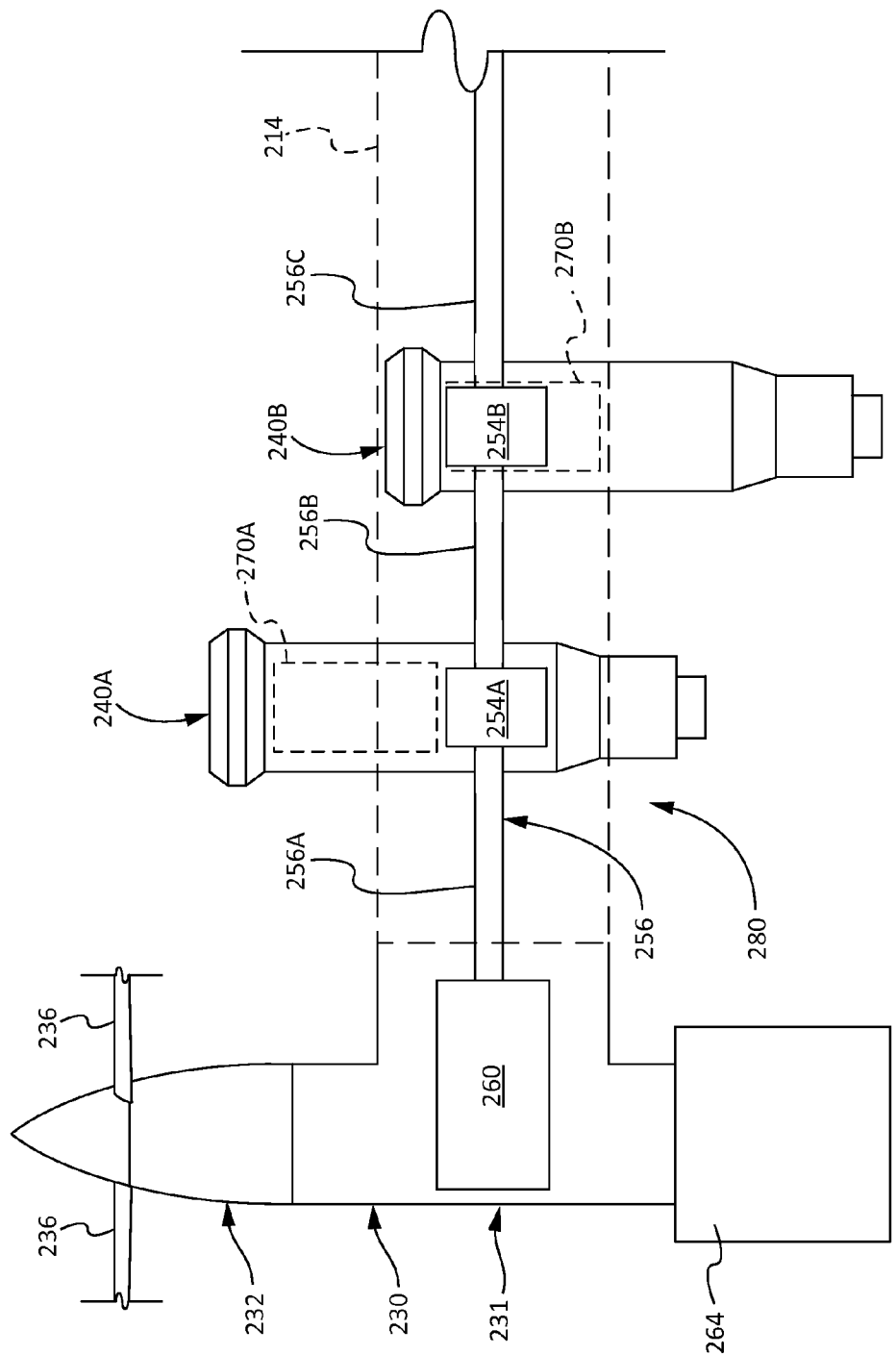
FIG. 7 is a schematic top view of a tilt-rotor assembly driven by engines in a staggered configuration according to one embodiment.
Figure 8:
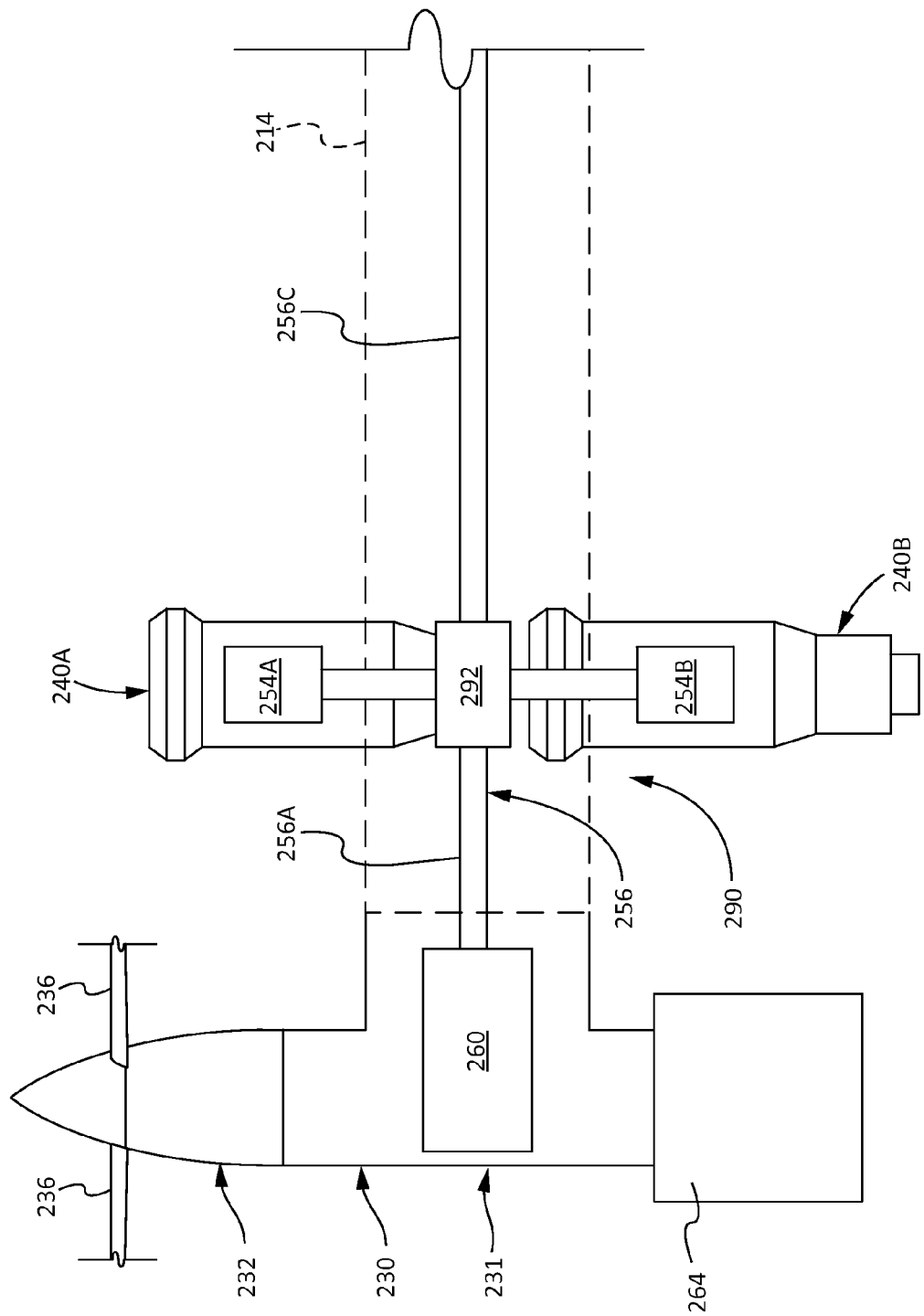
FIG. 8 is a schematic top view of a tilt-rotor assembly driven by engines in an end-to-end configuration according to one embodiment.

Referring to FIGS. 6-8, according to other embodiments, the spatial arrangement of the engines of a tilt-rotor, vertical-lift aircraft of the present disclosure can be configured differently. The embodiments of an aircraft shown in FIGS. 6-8 include some features that are analogous to the features of the aircraft 10. Generally, like features are referenced by like numbers. More specifically, the features of the aircraft in FIGS. 6-8 that are analogous to the features of the aircraft 10 share the same reference numbers, but are represented with a 200-series number instead of a 10-series number. For example, the aircraft shown in FIGS. 6-8 include a wing 214 with two engines 240A, 240B coupled to the wing. Power generated by the engines is transmitted to a power transmission system 250 with a driveshaft 256 that includes multiple driveshaft sections 256A-C rotatably coupled to at least one of two driveshaft gearboxes 254A, 254B each associated with a respective one of the engines. The power transmission system 250 then transfers power to a tilt-rotor assembly 230 with a drive system 231 for driving a rotor 232. The drive system 231 may also include a speed reduction gearbox 264 for reducing the rotational speed of the rotor 232 relative to the engines 240A, 240B and driveshaft 256. Generally, the engines 240A, 240B of the aircraft configurations in FIGS. 6-8 are stationary and non-movably fixed relative to the wings. Moreover, the engines 240A, 240B, although shown laterally offset from the rotor assembly 230, can be in-line with the rotor assembly 230 in some embodiments.

In FIG. 6, the engines 240A, 240B are spatially arranged in a side-by-side configuration. In other words, the engines 240A, 240B are laterally offset, but co-planar relative to a lateral plane extending perpendicularly from a central axis of the fuselage of the aircraft. According to another definition, the engines 240A, 240B are side-by-side because planes defining the fronts and/or rear of the engines are respectively co-planar with each other. With the engines 240A, 240B arranged side-by-side in this manner, the driveshaft gearboxes 254A, 254B can positioned in the same position (e.g., in the middle) relative to the respective engines.

As shown in FIG. 7, the engines 240A, 240B are spatially arranged in a staggered configuration. In other words, the engines 240A, 240B are laterally offset and longitudinally or axially offset relative to the central axis of the fuselage of the aircraft. According to another definition, the engines 240A, 240B are staggered because planes defining the fronts and/or rear of the engines are respectively axially offset with each other. The engines 240A, 240B may include compressors 270A, 270B, respectively, that are axially offset relative to each other due to the staggered configuration of the engines. To protect the compressor of one engine if the compressor of the other engine catastrophically fails (e.g., explodes), the axial offset of the engines 240A, 240B, including the compressors 270A, 270B, reduces the likelihood that a catastrophic failure of one compressor would catastrophically damage the other compressor. According to some implementations, to maintain axial alignment between the sections 256A-256C of the driveshaft 256, the driveshaft gearboxes 254A, 254B of the engines 240A, 240B can be positioned in different positions relative to the respective engines. For example, with the engine 240A (e.g., outboard engine) positioned forward of the engine 240B (e.g., inboard engine), the driveshaft gearbox 254A can be positioned rearward of the middle of the engine 240A, and the driveshaft gearbox 254B can be positioned forward of the middle of the engine 240B. In other implementations, the engines could be staggered by having the engine 240A be positioned rearward of the engine 240B, as opposed to forward as shown.

Referring to FIG. 8, the engines 240A, 240B are spatially arranged in an end-to-end configuration. In other words, the engines 240A, 240B are longitudinally or axially offset relative to the central axis of the fuselage of the aircraft, but are not laterally offset. The engines 240A, 240B can be coaxially aligned with each other such that the engine 240B is directly behind the engine 240A. In such implementations, it may be necessary to position an exhaust capture or redirection device between the exhaust outlet of the engine 240A (e.g., fore engine) and the engine 240B (e.g., aft engine). In other implementations, the engines 240A, 240B may be vertically staggered and still be arranged in an end-to-end configuration. In such implementations, an exhaust capture or redirection device at the exhaust outlet of the engine 240A may or may not be used. With the engines 240A, 240B in an end-to-end configuration, the driveshaft gearboxes 254A, 254B are not laterally aligned. Accordingly, a central driveshaft gearbox 292 may be used to receive power from the driveshaft gearboxes via respective power transmission shafts 291. The central driveshaft gearbox 292 may then be mechanically coupled to respective sections 256A, 256C of the driveshaft 256 to transfer power to the driveshaft.

Figure 9:
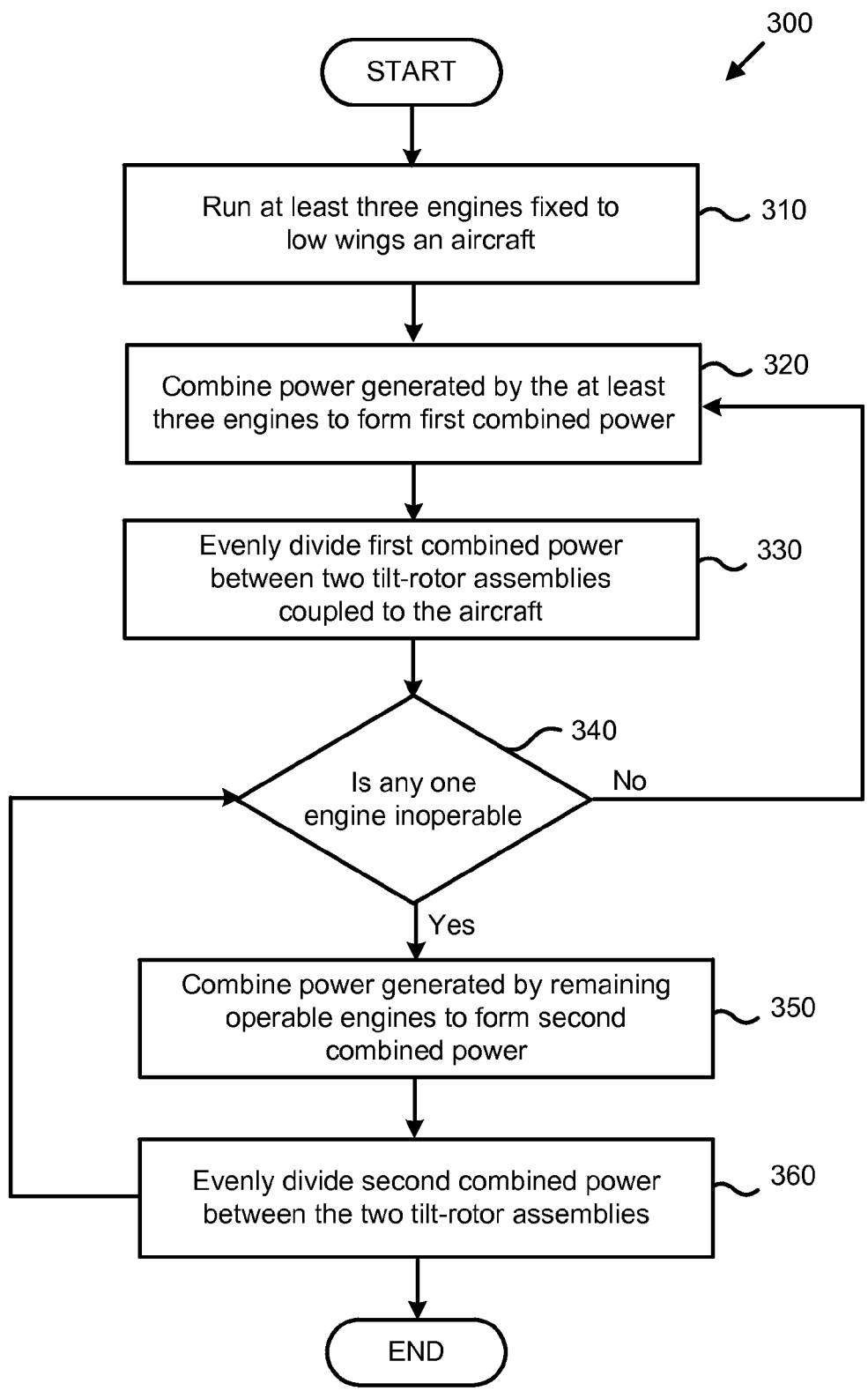
FIG. 9 is a schematic flow diagram of a method for operating an aircraft according to one embodiment.

Referring now to FIG. 9, one embodiment of a method 300 for operating an aircraft, such as a tilt-rotor, vertical-lift aircraft, is shown. The method 300 includes running at least four engines fixed to low wings of an aircraft at 310. The step 310 may also include providing a tilt-rotor, vertical-lift aircraft, such as an aircraft of the present disclosure. For example, the aircraft may include two low fixed wings and two tilt-rotor assemblies each rotatably coupled to a respective one of the two low fixed wings. The vertical-lift aircraft can further include at least three engines, such as two stationary engines non-movably coupled to each of the two low fixed wings. The method 300 further includes combining the power generated by the engines to form or create a first combined power at 320. Additionally, the method 300 includes evenly dividing the first combined power between two tilt-rotor assemblies coupled to the aircraft at 330.

At 340, the method 300 determines if any one engine is inoperable. If no one engine is inoperable, then the method 300 returns to step 320 and combines the power generated by all the engines. However, if one engine is inoperable, then the method 300 proceeds to combine the power generated by the remaining operable engines to form a second combined power at 350. The method 300 then evenly divides the second combined power between the two tilt-rotor assemblies at 360, and returns to step 340 of the method to determine if the inoperable engine is still inoperable. Although the method 300 in the illustrated embodiment of FIG. 9 is associated with an aircraft with at least three engines, the method is equally applicable to aircraft with more than three engines.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising,"

"having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The schematic flow chart diagram included herein is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. An aircraft, comprising:
   a fuselage comprising a higher portion and a lower portion;
   two fixed wings coupled to and extending from opposing sides of the lower portion of the fuselage;
   a tilt-rotor assembly coupled to each of the two fixed wings;
   at least two engines, non-movably coupled to each of the two fixed wings at locations on the two fixed wings between the fuselage and a respective one of the tilt-rotor assemblies;
   a common power transmission system, operatively coupling the tilt-rotor assemblies to the at least two engines coupled to each of the two fixed wings, wherein the common power transmission system comprises:
   a mid-wing gearbox positioned within the fuselage between the two fixed wings;
   a first driveshaft that extends between the mid-wing gearbox and a first of the tilt-rotor assemblies and a second driveshaft that extends between the mid-wing gearbox and a second of the tilt-rotor assemblies, wherein the mid-wing gearbox evenly distributes mechanical rotational energy between the first and second driveshafts at least while all of the at least two engines, non-movably coupled to each of the two fixed wings, are operable; and
   at least four driveshaft gearboxes coupled to the two fixed wings, wherein each of the at least four driveshaft gearboxes is in power receiving communication with a respective one of the at least two engines, coupled to each of the two fixed wings, and each of the at least four driveshaft gearboxes evenly distributes mechanical rotational energy from the respective one of the at least two engines, coupled to each of the two fixed wings, to respective sections of one of the first and second driveshafts coupled with each of the at least four driveshaft gearboxes;
   wherein: each tilt-rotor assembly comprises blades, rotatable about a common plane of rotation, and rotation of the first and second driveshafts rotates the blades of the first and second of the tilt-rotor assemblies, respectively;
   each tilt-rotor assembly is rotatable, relative to the two fixed wings, between a vertical orientation, in which the common plane of rotation is a horizontal plane, and a horizontal orientation, in which the common plane of rotation is a vertical plane, perpendicular to the horizontal plane; and
   the blades of each tilt-rotor assembly rotate about the horizontal plane, to generate the entire lift and no forward thrust of the aircraft, and about the vertical plane, to generate the entire forward thrust and no lift of the aircraft.

2. The aircraft of claim 1, wherein each of the tilt-rotor assemblies is coupled to a tip of a respective fixed wing.

3. The aircraft of claim 1, wherein each of the first driveshaft and the second driveshaft extends along a respective one of the two fixed wings.

4. An aircraft, comprising:
   a fuselage;
   first and second fixed wings coupled to and extending from opposing sides of the fuselage;
   first and second tilt-rotor assemblies coupled to the first and second fixed wings, respectively;
   at least two first engines non-movably coupled to the first fixed wing; and
   at least two second engines non-movably coupled to the second fixed wing;
   wherein the at least two first engines and the at least two second engines are operatively coupled to both the first and second tilt-rotor assemblies via a common power transmission system that comprises:

a mid-wing gearbox positioned within the fuselage between the first and second fixed wings;

a first driveshaft that extends between the mid-wing gearbox and the first tilt-rotor assembly and a second driveshaft that extends between the mid-wing gearbox and the second tilt-rotor assembly, wherein the mid-wing gearbox evenly distributes mechanical rotational energy between the first and second driveshafts at least while all of the at least two first engines and at least two second engines are operable; and at least four driveshaft gearboxes coupled to the first and second fixed wings, wherein each of the at least four driveshaft gearboxes is in power receiving communication with a respective one of the at least two first engines and at least two second engines, and each of the at least four driveshaft gearboxes evenly distributes mechanical rotational energy from the respective one of the at least two first engines and at least two second engines to respective sections of one of the first and second driveshafts coupled with each of the at least four driveshaft gearboxes.

5. The aircraft of claim 4, wherein each of the first driveshaft and second driveshaft extends along a respective one of the first and second fixed wings.

6. The aircraft of claim 4, wherein the common power transmission system comprises at least two first engine gearboxes in power receiving communication with a respective one of the two first engines, and at least two second engine gearboxes in power receiving communication with a respective one of the two second engines, and wherein the two first engine gearboxes and the two second engine gearboxes are in power providing communication with a respective one of the at least four driveshaft gearboxes of the common power transmission system.

7. The aircraft of claim 4, wherein the at least two first engines are arranged in a side-by-side configuration, and the at least two second engines are arranged in a side-by-side configuration.

8. The aircraft of claim 4, wherein the at least two first engines are arranged in an end-to-end configuration, and the at least two second engines are arranged in an end-to-end configuration.

9. The aircraft of claim 4, wherein the at least two first engines are arranged in a staggered configuration, and the at least two second engines are arranged in a staggered configuration.

10. The aircraft of claim 9, wherein in the staggered configuration, compressors of the at least two first engines are axially offset and compressors of the at least two second engines are axially offset.

11. The aircraft of claim 4, wherein the fuselage comprises a higher portion and a lower portion, and wherein the first and second fixed wings are coupled to and extend from the lower portion of the fuselage.

12. A vertical-lift aircraft, comprising:
a fuselage comprising a higher portion and a lower portion;
two fixed wings coupled to and extending from opposing sides of the lower portion of the fuselage;
two tilt-rotor assemblies each coupled to a respective one of the two fixed wings wherein:
each of the tilt-rotor assemblies comprise blades, rotatable about a common plane of rotation;
each of the tilt-rotor assemblies is rotatable, relative to the two low fixed wings, respectively, between a vertical orientation, in which the common plane of rotation is a horizontal plane, and a horizontal orientation, in which the common plane of rotation is a vertical plane, perpendicular to the horizontal plane; and the blades of each of the two tilt-rotor assemblies rotate about the horizontal plane, to generate the entire lift and no forward thrust of the aircraft, and about the vertical plane, to generate the entire forward thrust and no lift of the aircraft;

at least two engines non-movably coupled to each of the two fixed wings; and a power transmission system configured to transmit power generated by each of the at least two engines, non-movably coupled to each of the two fixed wings, to both of the two tilt-rotor assemblies, wherein the power transmission system comprises:

a mid-wing gearbox positioned within the fuselage between the two fixed wings;

a first driveshaft that extends between the mid-wing gearbox and a first of the tilt-rotor assemblies and a second driveshaft that extends between the mid-wing gearbox and a second of the tilt-rotor assemblies, wherein the mid-wing gearbox evenly distributes mechanical rotational energy between the first and second driveshafts at least while all of the at least two engines, non-movably coupled to each of the two fixed wings, are operable; and at least four driveshaft gearboxes coupled to the two fixed wings, wherein each of the at least four driveshaft gearboxes is in power receiving communication with a respective one of the at least two engines, coupled to each of the two fixed wings, and each of the at least four driveshaft gearboxes evenly distributes mechanical rotational energy from the respective one of the at least two engines, coupled to each of the two fixed wings, to respective sections of one of the first and second driveshafts coupled with each of the at least four driveshaft gearboxes.

13. The aircraft of claim 12, wherein each of the two tilt-rotor assemblies is coupled to a tip of the respective one of the two fixed wings.

14. The aircraft of claim 12, wherein the aircraft is a commercial passenger aircraft.

15. A method for operating an aircraft, comprising:
providing a tilt-rotor, vertical-lift aircraft comprising two low fixed wings and two tilt-rotor assemblies each rotatably coupled to a respective one of the two low fixed wings, wherein the vertical-lift aircraft further comprises:
at least four stationary engines, wherein two of the at least four stationary engines are coupled to each of the two low fixed wings at locations on the two low fixed wings away from the tilt-rotor assemblies;
a common power transmission system, operatively coupling the tilt-rotor assemblies to the at least two stationary engines coupled to each of the two low fixed wings, wherein the common power transmission system comprises:
a mid-wing gearbox positioned between the two low fixed wings;
a first driveshaft that extends between the mid-wing gearbox and a first of the tilt-rotor assemblies and a second driveshaft that extends between the mid-wing gearbox and a second of the tilt-rotor assemblies; and
at least four driveshaft gearboxes coupled to the two fixed wings away from the tilt-rotor assemblies;

wherein each of the two tilt-rotor assemblies comprise blades, rotatable about a common plane of rotation, and wherein rotation of the first and second driveshafts rotates the blades of the first and second of the tilt-rotor assemblies, respectively;

evenly distributing mechanical rotational energy from each stationary engine to respective sections of one of the first and second driveshafts via a respective one of the at least four driveshaft gearboxes; and evenly distributing mechanical rotational energy between the first and second driveshafts at least while all of the at least two stationary engines, coupled to each of the two low fixed wings, are operable.

* * * * *